(12) United States Patent
Lawrenson

(10) Patent No.: US 9,177,429 B2
(45) Date of Patent: Nov. 3, 2015

(54) METHOD AND APPARATUS FOR ASSIGNING PROFILE DATA TO ONE OR MORE VEHICLE SUB-SYSTEMS OF A VEHICLE

(71) Applicant: TELEFONAKTIEBOLAGET L M ERICSSON (PUBL), Stockholm (SE)

(72) Inventor: Matthew John Lawrenson, Lausanne (CH)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 101 days.

(21) Appl. No.: 14/066,386

(22) Filed: Oct. 29, 2013

(65) Prior Publication Data

US 2015/0120135 A1 Apr. 30, 2015

Related U.S. Application Data

(63) Continuation of application No. PCT/EP2013/072626, filed on Oct. 29, 2013.

(51) Int. Cl.

| | |
|---|---|
| G06F 7/00 | (2006.01) |
| G06F 17/00 | (2006.01) |
| B60R 22/00 | (2006.01) |
| E05F 15/00 | (2015.01) |
| G05D 1/00 | (2006.01) |
| G05D 3/00 | (2006.01) |
| G07C 5/08 | (2006.01) |
| B60W 50/08 | (2012.01) |
| B60R 25/20 | (2013.01) |
| B60R 16/037 | (2006.01) |
| B60W 50/00 | (2006.01) |

(52) U.S. Cl.
CPC .............. *G07C 5/085* (2013.01); *B60R 16/037* (2013.01); *B60R 25/2081* (2013.01); *B60W 50/085* (2013.01); *B60W 2050/0062* (2013.01); *B60W 2050/0064* (2013.01); *B60W 2050/0065* (2013.01); *B60W 2050/0089* (2013.01); *B60W 2540/04* (2013.01); *B60W 2540/28* (2013.01)

(58) Field of Classification Search
USPC ........... 701/36, 1, 48, 49, 45; 455/418, 435.2, 455/422.1, 437; 726/6; 340/439, 426.36; 725/10, 11; 307/10.1, 9.1
See application file for complete search history.

(56) References Cited

U.S. PATENT DOCUMENTS

| | | | | |
|---|---|---|---|---|
| 8,996,002 | B2 * | 3/2015 | Rodgers et al. | 455/435.2 |
| 2012/0053793 | A1 * | 3/2012 | Sala et al. | 701/45 |
| 2012/0053794 | A1 * | 3/2012 | Alcazar et al. | 701/48 |
| 2013/0295900 | A1 * | 11/2013 | Hood | 455/418 |
| 2013/0335213 | A1 * | 12/2013 | Sherony et al. | 340/439 |
| 2014/0310788 | A1 * | 10/2014 | Ricci | 726/6 |
| 2015/0061895 | A1 * | 3/2015 | Ricci | 340/902 |
| 2015/0091713 | A1 * | 4/2015 | Kohlenberg et al. | 340/426.36 |

* cited by examiner

*Primary Examiner* — Ronnie Mancho
(74) *Attorney, Agent, or Firm* — Rothwell, Figg, Ernst & Manbeck, P.C.

(57) ABSTRACT

This disclosure relates to a method, performed in an apparatus 300 for profile control, for switching profile data in one or more vehicle sub-systems 401, 402 of a vehicle 406. Each vehicle sub-system 401, 402 comprises a vehicle sub-system data storage 403, 404. The method comprises: detecting a presence of an occupant in the vehicle 406, identifying the occupant in the vehicle 406, retrieving from a profile data storage 405 the profile data corresponding to the identified occupant, assigning the retrieved profile data to one or more vehicle sub-systems 401, 402; and sending the retrieved profile data for storage in the vehicle sub-system data storage 403, 404 of the assigned one or more vehicle sub-systems 401, 402.

16 Claims, 6 Drawing Sheets

METHOD AND APPARATUS FOR ASSIGNING PROFILE DATA TO ONE OR MORE VEHICLE SUB-SYSTEMS OF A VEHICLE

CROSS REFERENCE TO RELATED APPLICATION(S)

This application is a continuation of PCT International Application No. PCT/EP2013/072626, filed Oct. 29, 2013, the disclosure of which is incorporated herein in its entirety by reference.

TECHNICAL FIELD

The present disclosure pertains to the field of controlling parameters of one or more vehicle sub-systems of a vehicle. More particularly, the disclosures relates to a method for assigning profile data to one or more vehicle sub-systems of a vehicle. The disclosure further relates to a corresponding apparatus for profile control of profile data in one or more vehicle sub-systems of a vehicle.

BACKGROUND

Services provided to a user in a vehicle, e.g. entertainment and navigation, tend to be more customizable to the present driver, or to one of the present passengers. Other services, e.g. road use tax, need to be billed per user and per mile rather than per vehicle. There are thus a growing number of vehicle sub-systems requiring increased connectivity to support these external services. At the same time, vehicles are to an increasing extent shared by multiple users and even have multiple owners in e.g. large cities. This results in a general increase of the average number of users per vehicle. With the growing number of vehicle sub-systems and the plurality of users and owners per vehicle, complexity in managing these sub-systems increases.

Existing systems for customization of services focus on customizing the mobile communication service. US2011/0306318 discloses a user device on which SIM data of a wireless network subscriber may be downloaded and stored. The device of US2011/0306318 may switch among multiple SIM profiles, each profile being associated with a different wireless account for the same user. US2010/0311468 discloses a virtual SIM card for mobile devices allowing provisioning of data for multiple service providers to be stored within the virtual SIM card and to be selectively enabled and disabled in order to select an optimal service.

The existing systems mentioned above are not able to address the complexity generated by having customizable vehicle sub-systems and a plurality of users of the same vehicle.

SUMMARY

An object of the present disclosure is to address the complexity of a growing number of vehicle sub-systems and a plurality of users per vehicle. The disclosure provides a method for assigning profile data to one or more vehicle sub-systems of a vehicle which seeks to mitigate, alleviate, or eliminate one or more of the above-identified deficiencies in the art and disadvantages singly or in any combination and to provide an apparatus for profile control of profile data in one or more vehicle sub-systems of a vehicle.

This object is obtained by a method, performed in an apparatus for profile control, for assigning profile data to one or more vehicle sub-systems of a vehicle. Each vehicle sub-system comprises a vehicle sub-system data storage. The method comprises: detecting a presence of an occupant in the vehicle, identifying the occupant in the vehicle, retrieving from a profile data storage the profile data corresponding to the identified occupant, assigning the retrieved profile data to one or more vehicle sub-systems; and sending the retrieved profile data for storage in the vehicle sub-system data storage of the assigned one or more vehicle sub-systems. This technique offers the advantage of scalability of customization of vehicle sub-systems in a vehicle having multiple users. This technique allows profile data (e.g. used for e.g. authorization, accounting, customization) to be interchangeable depending on who is in the vehicle. This can be beneficial for a driver that uses a shared vehicle, for loading his profile onto the road tax sub-system. The same applies to passengers using services related to the vehicle. For example, a passenger may want to use his favorite music in the entertainment system of the vehicle.

According to one aspect of the disclosure, the method comprises determining a role of the identified occupant in the vehicle, associating the determined role of the identified occupant to the profile data of the identified occupant, and wherein the step of assigning the profile data of the identified occupant to one or more vehicle sub-systems is performed based on the determined role of the identified occupant. This technique provides the advantage of supporting simultaneous multiple profiles to be loaded onto one or more vehicle sub-systems. A first passenger is able to load his profile in e.g. the entertainment sub-system while a second passenger is able to load his profile in e.g. a navigation sub-system and a driver loads his profile into e.g. the insurance system.

According to an aspect of the disclosure, the method further comprises controlling the vehicle sub-system according to the stored profile data. This disclosure provides an advantage in terms of seamless customization of services related to the vehicle to match an occupant's profile.

According to an aspect of the disclosure, the step of identifying the occupant in the vehicle further comprises identifying the occupant based on an occupant's physiological and/or behavioral characteristic. This allows for advanced identification and authentication of the occupants of a vehicle.

According to another aspect of the disclosure, the step of identifying the occupant in the vehicle comprises identifying the occupant based on a signal received from a device associated with the occupant. This provides seamless identification of the occupants as a device associated with an occupant often broadcasts regularly signals allowing identification.

According to another aspect of the disclosure, the profile data comprises a Subscriber Identity Module profile, or an embedded Subscriber Identity Module profile. The profile data comprises authorization to access user information, a user credential, and a user preference of the occupant. Using SIM or eSIM profile data as profile data in the proposed technique has the advantage of the profile data being readily available. One does not have to create a specific profile.

According to yet another aspect of the disclosure, the vehicle sub-system is a communication sub-system, and/or an entertainment sub-system, and/or an insurance monitoring sub-system, and/or a toll payment sub-system, and/or a navigation sub-system.

According to an aspect, it relates to an apparatus for profile control of profile data in one or more vehicle sub-systems of a vehicle. Each vehicle sub-system comprises a vehicle sub-system data storage. The apparatus comprises: a sensor configured to detect a presence of a occupant in the vehicle, a controller configured to identify the occupant of each vehicle sub-system and to assign a profile data to one or more vehicle sub-systems, and an interface configured to retrieve from a profile data storage the profile data corresponding to the identified occupant, and send the retrieved profile data to the vehicle sub-system data storage of the one or more assigned vehicle sub-systems. The apparatus disclosed herein is thus able to adapt operations of a vehicle sub-system to e.g. a user preference provided in a profile data.

According to an aspect of the disclosure, it relates to an integrated circuit card configured to perform the method as described above.

According to another aspect of the disclosure, it relates to a computer program comprising computer readable code which, when run on an apparatus, causes the apparatus to perform the method as described above.

According to one aspect of the disclosure, it relates to a vehicle comprising the apparatus as described above.

With the above description in mind, the object of the present disclosure is to overcome at least some of the disadvantages of known technology as described above and below.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
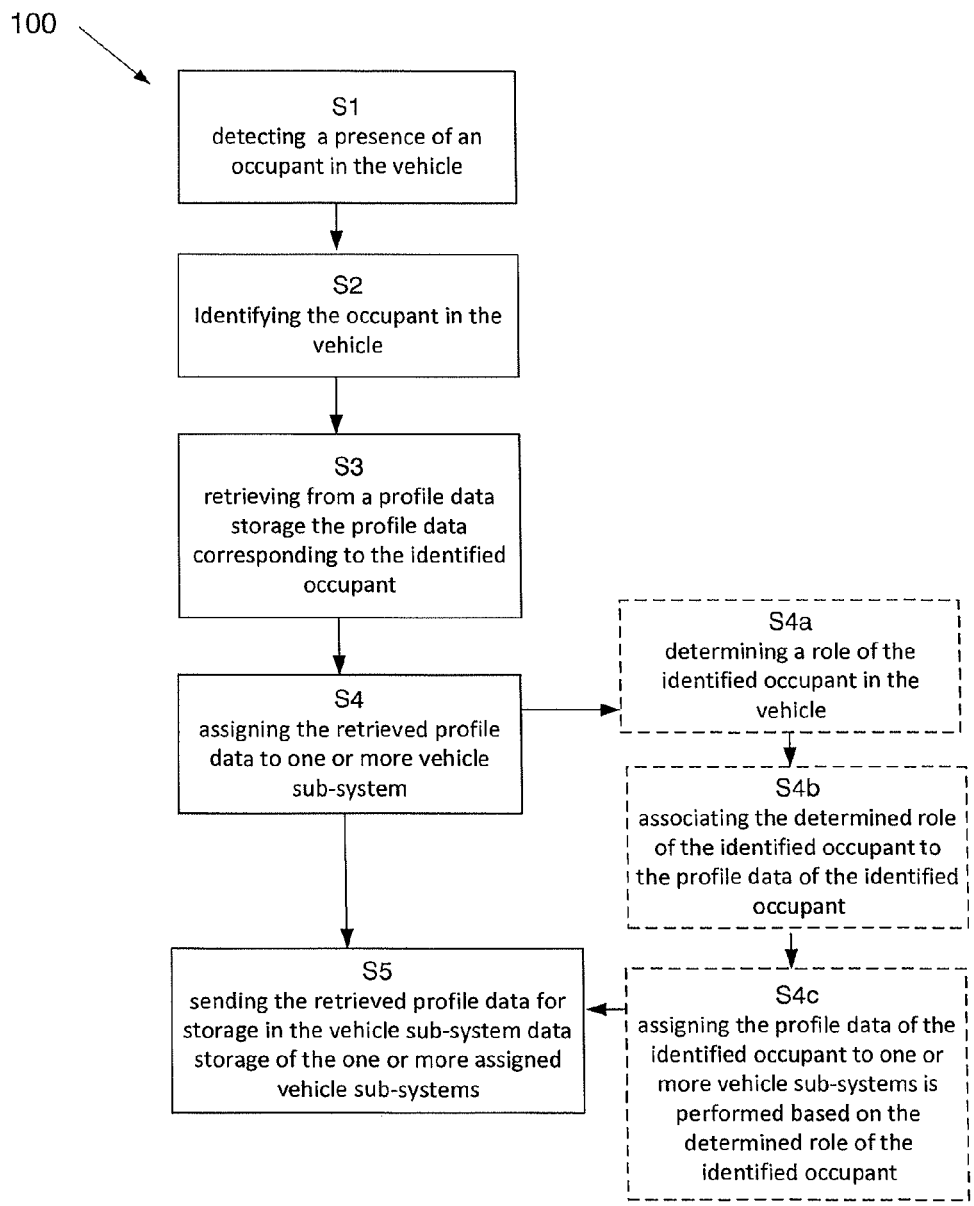
FIG. 1 is a flowchart illustrating embodiments of method steps.

Aspects of the present disclosure will be described more fully hereinafter with reference to the accompanying drawings. The method and apparatus disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

The general idea of the proposed technique is to identify a person or a group of persons as occupants of a vehicle and dynamically switch profile data of a vehicle sub-system to profile data of an occupant present in the vehicle. The profile data is either automatically or semi-automatically loaded into e.g. a universal integrated card circuit forming part of a vehicle sub-system. Thereby, one or more vehicle sub-systems of a vehicle are customizable to profile data of an occupant present in the vehicle, with no or very little interaction with the occupant. This is valid also for two or more vehicle sub-systems.

Embodiments of the present disclosure relate, in general, to the field of vehicle systems, and profile management. However, it must be understood that the same principle is applicable to other devices that have a higher level of shared ownership or use and that require customization to provide the appropriate services or comfort to a user.

In the present disclosure, the term "occupant" refers to a person who is in a vehicle. An occupant may be a driver, or a passenger. Any occupant of a vehicle can be designated as a user of the vehicle or a user of a vehicle sub-system. The occupant may be a recurring occupant, that has been present in the vehicle at previous times or a new occupant that is present for the first time in the vehicle. An occupant may be a driver, a passenger, a front seat passenger or a back seat passenger.

As used herein, the term "profile" refers to a collection of information related to an individual i.e. an occupant here, such as a user, a driver, or a passenger. The profile data refers to data representing the collection of information related to an occupant.

Examples of profile data comprises a Subscriber Identity Module profile, or an embedded Subscriber Identity Module profile. A Subscriber Identity Module, SIM, is an integrated circuit that securely stores identifiers and cryptographic material. A SIM circuit is usually embedded into a plastic card called a SIM card which may be a full size SIM card, a mini-SIM card, a micro-SIM card, a nano-SIM card or an embedded SIM card. A SIM may be implemented in a combination of a hardware component (such as a universal integrated card circuit, UICC) with a software component (implementing the SIM functionalities). A UICC may be a silicon chip embedded into a plastic card or an embedded UICC, eUICC, soldered into a circuit board along with other chips or as a component of a larger chip. An embedded Subscriber Identity Module, eSIM, is a SIM soldered directly onto a circuit board. A SIM profile can be unloaded from or loaded on a UICC with an eSIM profile stored in a local or remote memory. A UICC can host several eSIM profiles, however only one eSIM profile is active at a time. A SIM profile comprises cryptographic material (e.g. identifiers and encryption keys), and authorization to access pre-determined services. A SIM profile may also comprise network-specific information used to authenticate and identify subscribers on the network, such as an international mobile subscriber identity, IMSI, an integrated circuit card identifier, security authentication and ciphering information, a Short Message Service Center number, a Service Provider Name, Service Dialing Numbers, a Advice-Of-Charge parameter and a Value Added Service application, a Local Area Identity and an Operator-Specific Emergency Number. A SIM profile comprises also e.g. a list of contact information. The difference between a SIM profile and an eSIM profile resides in the transferability of the profile from one card to another. A SIM profile is stored in and associated with a single SIM card while an eSIM profile is transferrable from card to card. In the present disclosure, a different eSIM profile can be used by a vehicle sub-system depending on who is in the vehicle and/or what is a role of the individual in the vehicle (e.g. driver, passenger). A traditional machine-to-machine system is likely to have one SIM only, and that SIM is likely to be a physical plastic card that requires physical intervention to switch it to another one. This is disadvantageous when a vehicle has multiple occupants, or multiple owners. Therefore, the eSIM profile loaded on a eUICC in a machine-to-machine system is more convenient and scalable than the traditional machine-to-machine system with SIM card.

Profile data may comprise authorization to access user information, a user credential, and a user preference of an occupant. Authorization to access user information of an occupant is an authorization to access, for that occupant, user information related to e.g. insurance policy, road-side assistance, and an authorization to access a service that the occupant subscribes to, e.g. a live concierge service, a live translation service or a digital music service. A user credential refers to information proving user legitimacy and/or a legitimate access to data or services and information allowing identification of a user. User credentials may be cryptographic material, such as keys and passwords. User credentials in biometrics are e.g. fingerprints, retinal characteristics, voice characteristics. A user preference refers to a set of parameters selected by the user or occupant to customize a sub-system. Examples of user preference relate to elements in a vehicle, e.g. seat, mirror, temperature, radio channels, and/or audio music files, etc. but also related to navigation, e.g. an itinerary, user interface settings (color theme, instructor voice, and language), a point of interest.

As used herein, the term "vehicle sub-system" refers to a system that forms part of a vehicle system. A vehicle comprises one or more sub-systems used for its operations (e.g. an engine sub-system, a brake sub-system, a gear sub-system, a steering wheel sub-system, a mirror sub-system, a lighting sub-system, a parking assistance sub-system, a driving mode sub-system, a suspension adjustment sub-system, a dashboard sub-system), and for the comfort of drivers and passengers (e.g. an air conditioning sub-system, a seat adjustment sub-system, a window sub-system). A vehicle may be a bicycle, a car, a truck, a bus, a motorcycle, a train, a ship, a boat and an aircraft. A vehicle sub-system may be a component of a vehicle capable of supporting machine-to-machine communication. Examples of vehicle sub-system comprise any of the above-mentioned sub-systems and/or a communication sub-system, and/or an entertainment sub-system, and/or an insurance monitoring sub-system, and/or a toll payment sub-system, and/or a navigation sub-system. A communication sub-system loads profile data to obtain e.g. contact information in an address book, and allow communicating directly or via a handheld device connection in a hands-free way. An entertainment sub-system comprises a vehicle audio sub-system, a video sub-system, and/or a gaming sub-system. An entertainment sub-system is e.g. loaded with profile data that sets up the sub-system according to user preferences and/or gives access to a remote or local entertainment file (such as a music file, a video file or a gaming file) to output for the comfort and entertainment of an occupant in a vehicle. An insurance monitoring sub-system loads profile data related to e.g. insurance coverage, insurance policy, insurance phone numbers, road-side assistance. A toll payment sub-system loads profile data related to user credentials that enable payment authorization on e.g. a driver's account. A navigation sub-system loads profile data related to e.g. user preferences in terms of locations, and user interface settings (such as a color theme, an instructor voice, and a language).

FIG. 1 shows a flowchart illustrating a method 100, performed in an apparatus 300 for profile control, for assigning profile data to one or more vehicle sub-systems of a vehicle. Assigning a profile data of an occupant to one or more vehicle sub-systems involves switching profile data of the one or more vehicle sub-system if a vehicle sub-system data storage already stores profile data.

In the first step S1, the apparatus 300 detects a presence of an occupant in the vehicle, e.g. by a sensor comprised in the apparatus. Detection is performed for example using a sensor in each vehicle seat that is capable of detecting if a person is sitting on a seat, or a sensor detecting the opening of a vehicle door or a sensor detecting a key in the ignition of the vehicle.

In the next step S2, the apparatus 300 identifies the occupant in the vehicle. The apparatus 300 comprises a device capable of identifying the occupant in the vehicle. According to one aspect of the disclosure, the step of identifying the occupant in the vehicle further comprises identifying the occupant based on an occupant's physiological and/or behavioral characteristic. Identification is performed for example using a biometrics sensor that is capable of identifying an occupant based on his body characteristics or traits such as physiological characteristics and/or behavioral characteristics. Physiological characteristics are characteristics related to a form of a body, e.g. fingerprint or iris recognition. Behavioral characteristics are characteristics related to how a person behaves e.g. a person's gait, driving style. According to one aspect of the disclosure, the step of identifying the occupant in the vehicle further comprises identifying the occupant based on a signal received from a device associated with the occupant. Alternatively, identification is performed by assessing a signal that can be associated with a person, for example a signal emitted from a cellular, WIFI, Bluetooth, NFC or any other wireless system transmitter in a handheld device or a keycard used to unlock the vehicle. The apparatus 300 identifies the occupant in the vehicle e.g. via one or more measures providing a likelihood of an identification of a person. These measures include a likelihood factor that is derived for example from a biometric measurement compared to a stored set of measurements. A likelihood factor assesses the probability of an identified occupant matching an actual person. Likelihood can be expressed in levels (e.g. likely, possible, not likely), or in a percentage score. The apparatus 300 in this step identifies one or more occupants of the vehicle, independently of whether an occupant is a driver or a passenger. The apparatus 300 performs the identification of the occupant periodically or at a specific event, e.g. turn off/turn on of the engine.

In the next step S3, the apparatus 300 retrieves from a profile data storage 405 the profile data corresponding to the identified occupant. The profile data storage 405 is e.g. an eSIM profile database and a lookup table associating occupants to profile data. Once the occupant identified, the apparatus 300 retrieves the profile data of the occupant using e.g. an occupant identifier, and possibly via a profile manager. The occupant identifier is stored locally e.g. in the vehicle or remotely e.g. in a handheld device of the occupant or in an accessible personal area network belonging to the occupant. If the eSIM profile or profile data database is internal to the vehicle, then the retrieval can be achieved via local, and/or hardwired connections. If the eSIM profile or profile data database is external to the vehicle, then the retrieval is achieved via an over-the-air connection. The apparatus 300 establishes a secure connection to the profile data database. In an embodiment, the apparatus 300 uses the identity of the occupant to query a person lookup table in order to find the occupant's details associated to profile data or eSIM profile.

In the next step S4, the apparatus 300 assigns the retrieved profile data to one or more vehicle sub-systems 401, 402. The apparatus 300 assigns the retrieved profile data to e.g. two or more vehicle sub-systems. The same profile data is assigned to each vehicle sub-system.

Alternatively, a different profile data is assigned to each vehicle sub-system. In an embodiment, the assignment of profile data to one or more vehicle sub-system is based on an occupant's input on a user interface of the vehicle.

According to an aspect of the disclosure, in a step S4a, the apparatus 300 determines a role of the identified occupant in the vehicle. The apparatus 300 associates in step S4b the determined role of the identified occupant to the profile data of the identified occupant. The apparatus 300 assigns in step 4c the profile data of the identified occupant to one or more vehicle sub-systems based on the determined role of the identified occupant. The different roles available are e.g. driver, copilot, passenger in a front seat, passenger in seat X. The role is determined using sensors detecting e.g. on which seat the occupant sits to find out whether the occupant is likely a driver or a passenger. The role is further assessed using a person lookup table holding a function of an individual and a seniority of an individual. The apparatus 300 matches the vehicle occupants and roles to a set of profile data, either individually or in groups. The proposed technique allows for the occupant's profile data to be assigned according to the determined role of the occupant. For example, if the role of the occupant is determined to be the driver, then the proposed technique suggests assigning the occupant's profile data to e.g. the road tax sub-system and the insurance monitoring sub-system. For an occupant determined to be a passenger, the proposed technique proposes to assign the occupant's profile data to e.g. the entertainment sub-system.

For example, let us assume a vehicle with two occupants, one being the driver, and the other being a passenger. Once the occupants identified and their respective roles determined, the proposed technique allows for the driver's profile data to be assigned to e.g. the road tax sub-system and the insurance monitoring sub-system and the passenger's profile data to be assigned to e.g. the entertainment sub-system. This is changeable at any time during the presence of the occupants in the vehicle using the proposed technique.

In the next step S5, the apparatus 300 sends S5 the retrieved profile data for storage in the vehicle sub-system data storage 403, 404 of the assigned one or more vehicle sub-systems 401, 402. The profile data storage 405 is e.g. a memory. The memory can be any combination of a Read And write Memory, RAM, and a Read Only Memory, ROM. The memory also comprises persistent storage, which, for example, can be any single one or combination of magnetic memory, optical memory, or solid state memory or even remotely mounted memory. The apparatus 300 sends the retrieved profile data for storage in the vehicle sub-system data storage 403, 404 according to the assignment performed in an earlier step.

Figure 2:
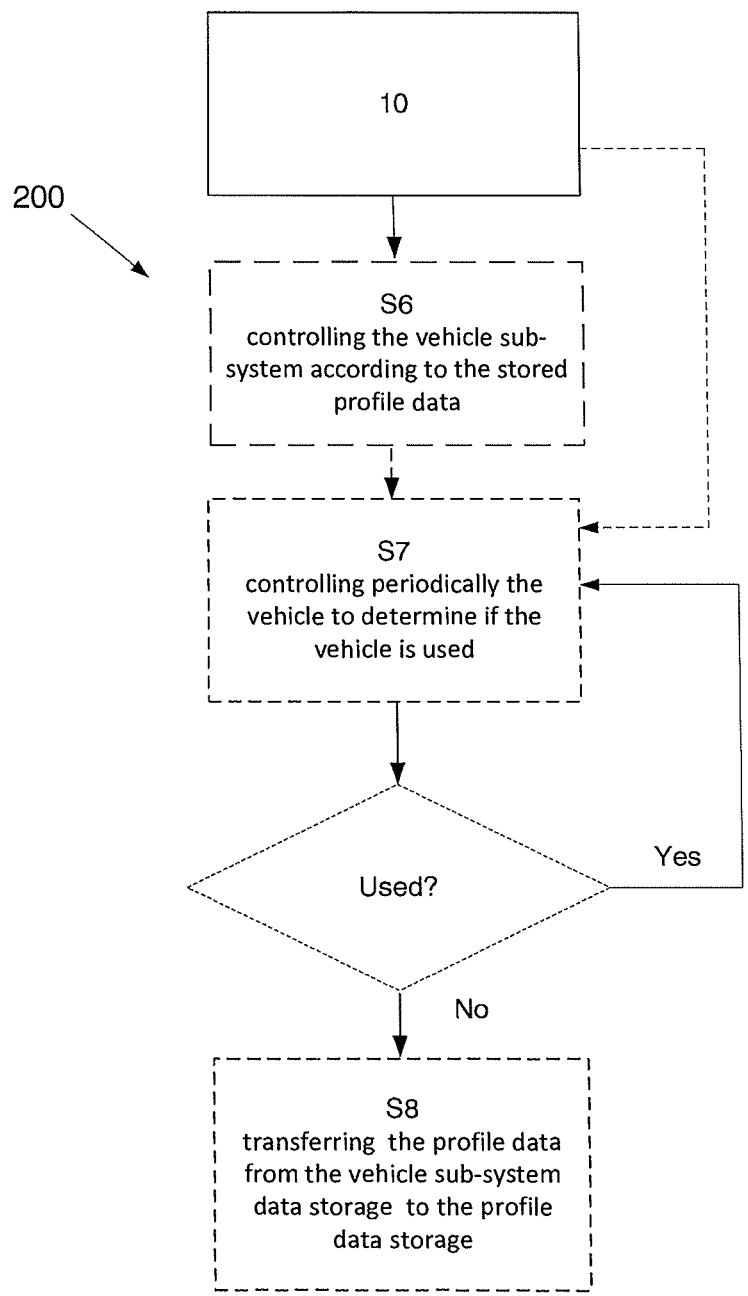
FIG. 2 is a flowchart illustrating a method steps of the disclosure according to exemplary embodiments of the present disclosure.

FIG. 2 shows a flowchart illustrating a method of the disclosure according to an exemplary embodiment of the present disclosure. According to an aspect of the disclosure, in step S6 following the method steps of FIG. 1, the apparatus 300 controls one or more vehicle sub-systems according to the stored profile data. The apparatus 300 controls the vehicle sub-system by the profile data stored in the vehicle sub-system data storage. The vehicle sub-system reads the stored profile data to adjust its operations according to the stored profile data. For example, a communication sub-system reads, from the profile data, the contact information of the occupant's address book and thereby allows direct hand-free calls to be taken from the vehicle. A navigation sub-system adapts its user interface according to user preferences of the occupant stored in the profile data and uses e.g. the home address, and the work address accessible using the profile data.

In a step S7 of FIG. 2, the apparatus 300 controls periodically the vehicle to determine if the vehicle is used and if it is determined that the vehicle is not used, the apparatus 300 transfers in step S8 the profile data from the vehicle sub-system data storage 403, 404 to the profile data storage 405. The apparatus 300 checks for actions indicating that the vehicle is in use or not. Determining if the vehicle is used involves e.g. sensors capable of detecting an activity in the vehicle (such as motion sensors, car seat sensors, door sensors, ignition sensors). During a setup phase, each action can be sensed by an action identification sensor and added as an entry in a trigger lookup table. The trigger lookup table comprises a list of triggers indicating that the vehicle has ceased to be used or is to be used, such as any parameter indicative of strength of action, or of loudness. The trigger lookup table comprises also information as to other actions that are to be detected within a given time period in order to be defined as a trigger, e.g. turning off the ignition and opening the door. The activity is monitored on a continuous basis to detect triggers, e.g. turning off the ignition, opening the door, vacancy of driver's seat.

The apparatus 300 checks the detected action against a list of actions designated as triggers indicating the vehicle has ceased to be used in the trigger lookup table. If such a trigger is detected, then the apparatus 300 communicates with e.g. the profile manager indicating that the profile data or eSIM profile is to be removed and transferred back to the profile data storage.

Figure 3:
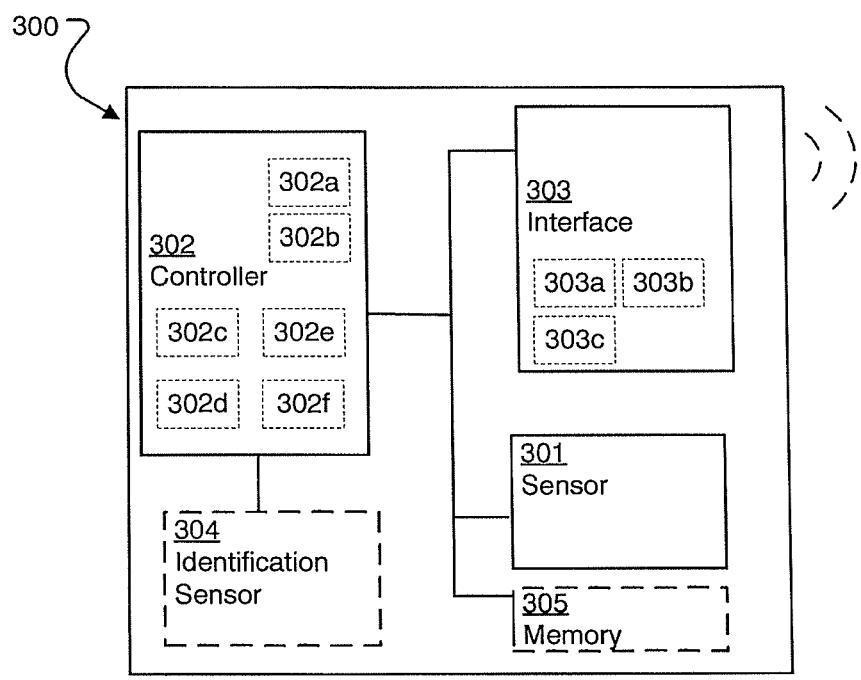
FIG. 3 is an exemplary block diagram illustrating embodiments of an apparatus.

FIG. 3 shows an exemplary block diagram of an apparatus 300 for profile control of profile data in one or more vehicle sub-systems of a vehicle according to an exemplary embodiment of the present disclosure. The apparatus comprises a sensor 301, a controller 302, and an interface 303.

The sensor 301 is configured to detect a presence of an occupant in the vehicle. The sensor 301 is e.g. an action identification sensor, i.e. a sensor capable of identifying an action involving the vehicle. The sensor 301 is for example a sensor in a vehicle seat that is capable of detecting if a person is sitting on a seat, or a sensor detecting the opening of a vehicle door or a sensor detecting a key in the ignition of the vehicle. The sensor 301 is additionally e.g. a person identification sensor, i.e. a sensor capable of identifying a person (e.g. via biometrics). For example, a weight scale in a seat returns for example the information that a person sat down (which relates action identification sensing) and gives the weight of the person (which relates more to person identification sensing). The processing of the identification information collected by e.g. sensors takes place in the sensor 301 itself or at the controller 302.

During a setup phase, each action that can be sensed by a sensor 301 has an entry in a trigger lookup table indicating whether the action is designated as a trigger indicating that the vehicle is likely to be in use or about to be used. The trigger includes any necessary parameter such as strength of action, or necessary loudness. The trigger lookup table includes information related to an action taking place within a predefined time period after another action so that such action can be defined as a trigger. In other words, the trigger lookup table comprise information as to other actions that must be detected within a given time period in order to be defined as a trigger. An example of such a trigger is "opening the car door, and sitting in the driver's seat". One or more sensors 301 monitor the activity within the vehicle on a continuous basis or periodically. When an action or activity is detected, the action is reported to the controller 302 that checks it against the trigger lookup table to determine the likelihood that the vehicle is used, or to be used shortly. Examples of actions indicating that the vehicle is being in use or about to be used comprise opening a car door, sitting in a seat, putting the key in the ignition, or receiving a signal from a keycard to unlock the vehicle. If the reported action corresponds to a trigger in the trigger lookup table, then the process moves to the next step of identification of the occupants.

The controller 302 is configured to identify the occupant in the vehicle and to assign a profile data to one or more vehicle sub-systems 401, 402. Hence, the controller 302 comprises an identifier 302a to identify the occupant in the vehicle and an assigning module 302b to assign a profile data to one or more vehicle sub-systems 401, 402. The identifier 302a uses e.g. an identification sensor 304 to ascertain the vehicle's occupants via measurements. The devices used to identify the occupant include a personal identification sensor:

using biometric assessment (such as camera capable of facial recognition or a weight scale built into a seat), or assessing a signal that can be associated with a person (such a cellular, WIFI, NFC or Bluetooth signal emitted from a handheld device, or a use of a keycard that unlocks the vehicle).

The controller 302 identifies the occupant in the vehicle via e.g. one or more measurements providing a likelihood of an identification of a person. These measurements include a likelihood factor that is derived for example from a biometric measurement compared to a stored set of measurements.

The controller 302 is a processor capable of executing a computer program code. The computer program code enables the controller 302 to perform the following steps: identify the occupant in the vehicle and assign a profile data to one or more vehicle sub-systems 401, 402. The computer program is stored in a memory 305. The memory 305 can be any combination of a Read And write Memory, RAM, and a Read Only Memory, ROM. The memory 305 also comprises persistent storage, which, for example, can be any single one or combination of magnetic memory, optical memory, or solid state memory or even remotely mounted memory. As an alternative the steps, functions, procedures and/or blocks described above as an alternative, be implemented completely or partly in hardware using any conventional technology, such as discrete circuit or integrated circuit technology, including both general-purpose electronic circuitry and application-specific circuitry. The memory and the processor are then replaced by corresponding hardware blocks.

The assigning module 302b is configured to assign a profile data to one or more vehicle sub-systems 401, 402. The assigning module 302b assigns profile data based on e.g. an input from an occupant, e.g. when occupant wants to have his music loaded in the entertainment system. According to one aspect of this disclosure, the assigning module 302b or the controller 302 performs the assignment by determining S4a a role of the identified occupant in the vehicle, associating S4b the determined role of the identified occupant to the profile data of the identified occupant, and assigning S4c the profile data of the identified occupant to one or more vehicle sub-systems based on the determined role of the identified occupant. Hence, the controller 302 comprises a first determiner 302c and an associating module 302d. The different roles available are e.g. driver, copilot, passenger in a front seat, passenger in seat X. The associating module 302d is configured to associate the determined role of the identified occupant to the profile data of the identified occupant. The associating module 302d appends the determined role to the profile data. Depending on whether the identified occupant is determined to be the driver or a passenger by the determiner 302c, the assigning module 302b assigns the identified occupant's profile data to a different vehicle sub-system. The first determiner 302c determines a role using e.g. sensors detecting e.g. on which seat the occupant seats to find out whether the occupant is a driver or a passenger. The first determiner 302c further assesses the role using a lookup table holding a function of an individual and a seniority of an individual. The assigning module 302b for example matches the vehicle occupants and roles to a set of profile data, either individually or in groups. Finally, the assigning module 302b assigns the profile data of the identified occupant to the corresponding vehicle sub-system. Additionally, the occupant selects which profile data is to be loaded on which vehicle sub-system and input the selection in a user interface of apparatus 300, which would then transfer the selection to the controller 302 (which would use the assigning module 302b).

The interface 303 is configured to retrieve from a profile data storage 405 the profile data corresponding to the identified occupant, and to store the retrieved profile data in the vehicle sub-system data storage 403, 404 of the one or more assigned vehicle sub-systems 401, 402. Hence, the interface 303 comprises a retrieving module 303a and a sender 303b.

The retrieving module 303a is configured to retrieve from a profile data storage 405 the profile data corresponding to the identified occupant. Hence, the retrieving module 303a comprises a transmitter to be able to transmit a request of a profile data to the profile data storage 405; and a receiver to receive the response including the requested profile data. The profile data storage 405 is e.g. an eSIM database storage and a lookup table associating an occupant to profile data. Once the occupant identified, the retrieving module 303a retrieves the profile data of the occupant using e.g. a request including an occupant identifier, possibly via a profile manager. The occupant identifier is stored locally in the vehicle or remotely e.g. in a handheld device of the occupant or in an accessible personal area network belonging to the occupant. If the eSIM profile or profile data database is internal to the vehicle, then the retrieving module 303a is e.g. hardwired to the profile data storage 405. If the eSIM profile or profile data database is external to the vehicle, then the retrieving module 303a uses an over-the-air connection. The retrieving module 303a establishes a secure connection to the profile data storage 405, with adequate encryption.

The sender 303b is configured to send the retrieved profile data for storage in the vehicle sub-system data storage 403, 404 of the one or more assigned vehicle sub-system 401, 402. The profile data storage 405 is e.g. a memory, or part of a storage area network. The memory can be any combination of a Read And write Memory, RAM, and a Read Only Memory, ROM. The memory also comprise persistent storage, which, for example, can be any single one or combination of magnetic memory, optical memory, or solid state memory or even remotely mounted memory. The sender 303b sends the retrieved profile data for storage in the vehicle sub-system data storage 403, 404 according to the assignment performed by the assigning module 302b.

According to one aspect of this disclosure, the controller 302 is further configured to control periodically the vehicle to determine if the vehicle is used. If it is determined that the vehicle is not used, the controller 302 transfers the profile data from the vehicle sub-system data storage 403, 404 to the profile data storage 405. Hence, the controller 302 comprises a second determiner 302e and a transferring module 302f. The second determiner 302e is configured to periodically determine if the vehicle is in use or has ceased to be used. The second determiner 302e uses e.g. sensors 301 capable of detecting an activity or lack of an activity in the vehicle (such as motion sensors, car seat sensors, door sensors, ignition sensors). The second determiner 302e evaluates the action against a list of actions designated as triggers indicating the vehicle is in use or not, in a trigger lookup table. If the second determiner 302e evaluates the action detected to be a trigger, then the second determiner 302e communicates with the transferring module 302f (e.g. the profile manager) indicating that the profile data or eSIM profile is to be removed and transferred back to the profile data storage. If it is determined that the vehicle is in use, then the controller 302 continues to control periodically the activity in the vehicle.

According to one aspect of this disclosure, the interface 303 is a machine-to-machine communication interface and/or a wireless communication interface. Hence, the interface 303 comprises a transceiver 303c, capable of transmitting and receiving data. The transceiver 303c comprises e.g. a radio chip.

Figure 4:
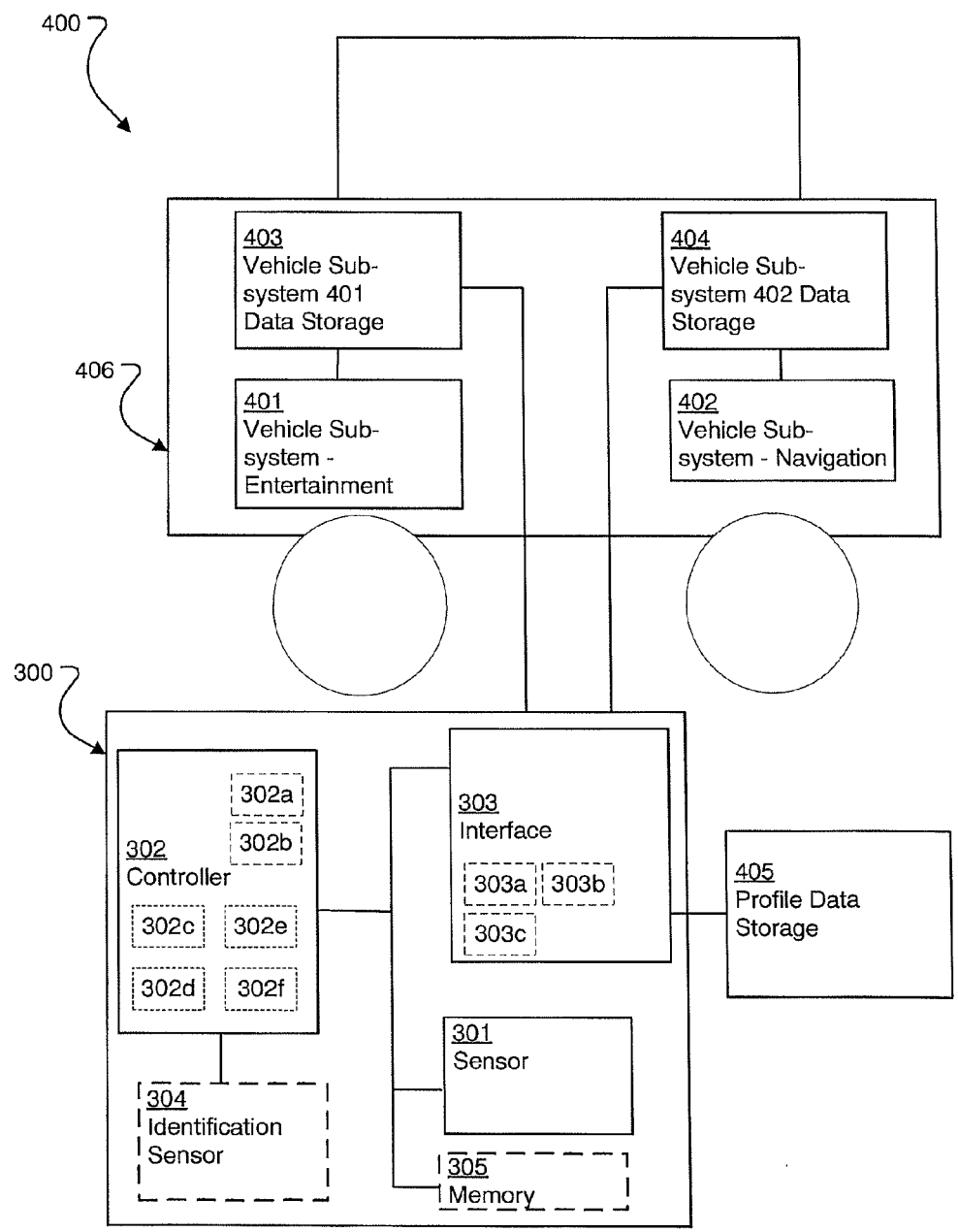
FIG. 4 is a block diagram illustrating an exemplary system architecture.

FIG. 4 shows an exemplary system architecture 400. FIG. 4 shows an apparatus 300 for profile control, a vehicle 406, and a profile data storage 405. The vehicle 406 comprises a vehicle sub-system 401 with a vehicle sub-system data storage 403, and a vehicle sub-system 402 with a vehicle sub-system data storage 404. The apparatus 300 retrieves profile data from a profile data storage 405. The apparatus 300 controls either directly or via the interface 303 the vehicle sub-systems 401, 402 according to the profile data stored in their respective data storages 403, 404. The apparatus 300 controls the vehicle sub-systems 401, 402 by sending the profile data for storage in the vehicle sub-system data storages 403, 404. The vehicle sub-system 401, 402 adjusts then its operation to the profile data that it retrieves from data storage 403, 404.

Figure 5:
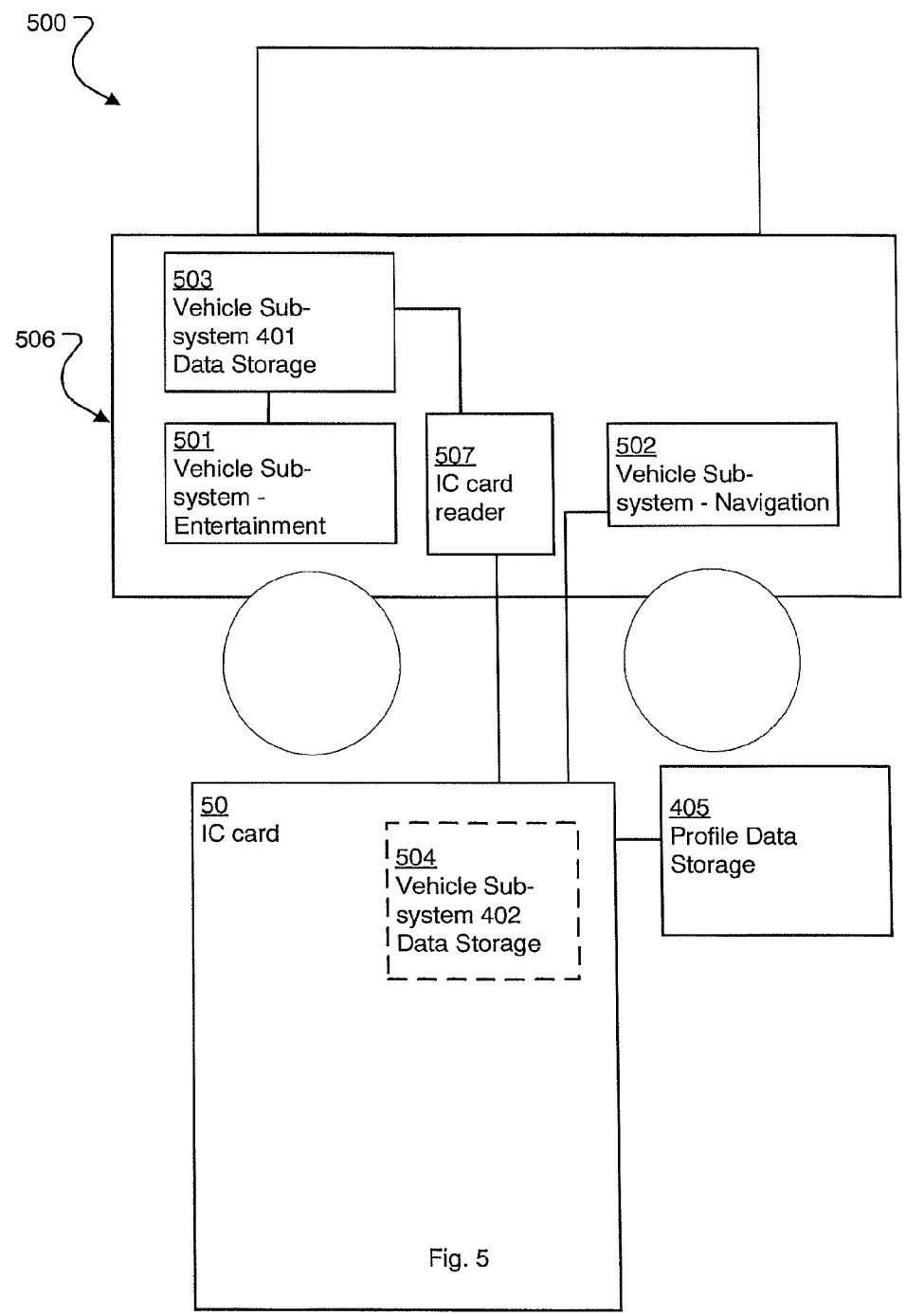
FIG. 5 is a block diagram illustrating an embodiment of an integrated circuit card.

FIG. 5 shows an exemplary block diagram of an integrated circuit card 50 configured to perform the method described above. The integrated circuit, IC, card 50 is attached to a vehicle 506 in an interoperable manner so as to perform the method described above. The vehicle 506 comprises vehicle sub-system 501 with a vehicle sub-system data storage 503, and a vehicle sub-system 502, and a IC card reader 507. The IC card 50 is connected to the profile data storage 405 in the same way as apparatus 300. The integrated circuit card 50 interacts with the vehicle 506 through the integrated circuit card read 507 of the vehicle 506. Alternatively, the integrated circuit card 50 is embedded in the vehicle 506.

According to one aspect of this disclosure, the vehicle sub-system data storage 504 is comprised in an integrated circuit card 50. The vehicle sub-system data storage 504 is comprised in e.g. a UICC that stores eSIM profiles to be used in the vehicle sub-system 502.

Figure 6:
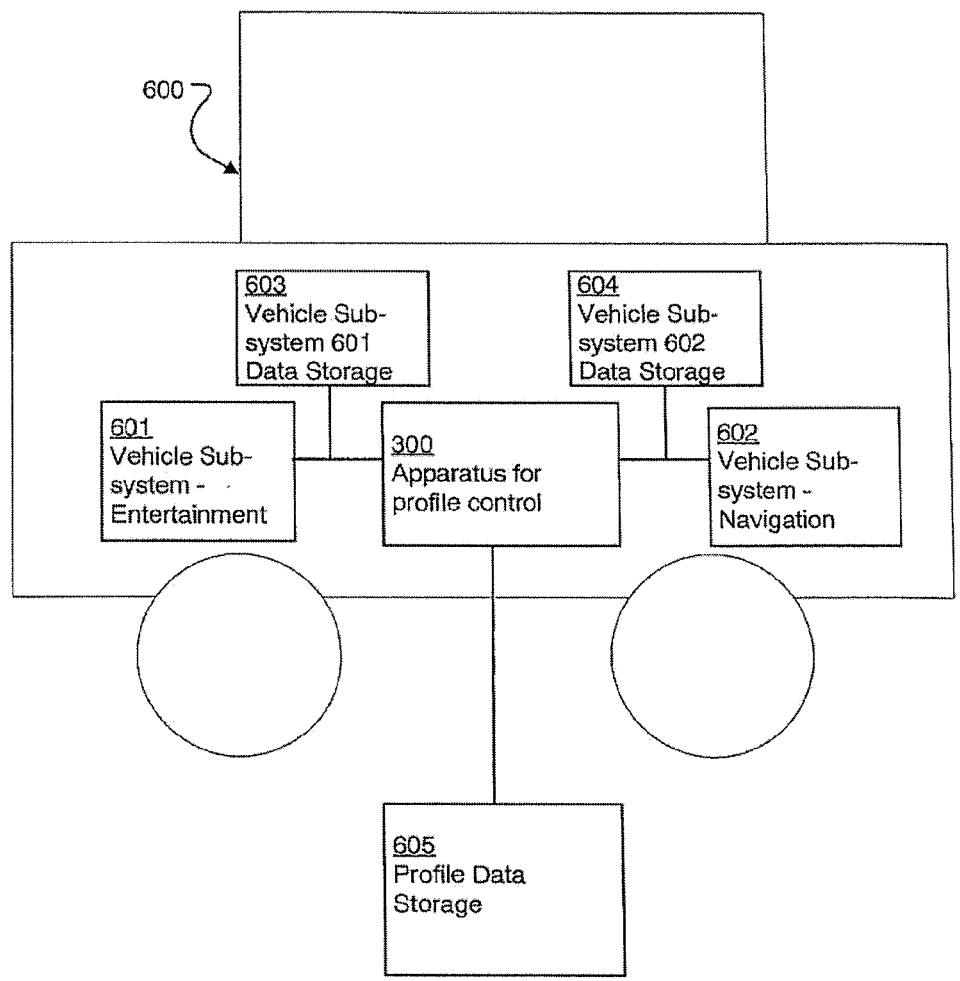
FIG. 6 is a block diagram of an embodiment of a vehicle comprising an apparatus for profile control.

FIG. 6 is a block diagram of an embodiment of a vehicle 600 comprising. According to another aspect of this disclosure, this disclosure relates to a vehicle comprising the apparatus 300 described above. The vehicle 600 comprises an apparatus 300 for profile control, a vehicle sub-system 601 with a vehicle sub-system data storage 603, and a vehicle sub-system 602 with a vehicle sub-system data storage 604. The apparatus 300 communicates with the vehicle sub-system data storages and the profile data storage 605. In this embodiment, the apparatus 300 is located in the vehicle. The person lookup table, the trigger lookup table and profile data storage 605 be located in the vehicle or remotely from the vehicle. If remotely located, then the controller 302 has a data connection to the lookup tables and profile data storage 605. The person lookup table, the trigger lookup table and the profile data storage 605 can be shared by several (sub-)systems or replicated across several (sub-)systems. If replicated, then the apparatus 300 comprises an additional element configured to perform the replication. The entries in the person lookup table and the trigger lookup table can be done manually via users adding information prior to use of the vehicle or dynamically, or via collecting information as users allow eSIM profiles to be loaded into the system.

According to a further aspect of this disclosure, this disclosure relates to a computer program comprising computer readable code which, when run on a controller of an apparatus, causes the apparatus to perform the method described above. The computer program is stored in e.g. a memory. The memory can be any combination of a Read And write Memory, RAM, and a Read Only Memory, ROM. The memory may also comprise persistent storage, which, for example, can be any single one or combination of magnetic memory, optical memory, or solid state memory or even remotely mounted memory. When the above-mentioned computer program code is run in a processor of an apparatus, it causes the apparatus to perform the method described above.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method, performed in an apparatus for profile control, for assigning profile data to one or more vehicle sub-systems of a vehicle, each vehicle sub-system comprising a vehicle sub-system data storage, the method comprising:
   detecting a presence of an occupant in the vehicle;
   identifying the occupant in the vehicle;
   retrieving from a profile data storage profile data corresponding to the identified occupant;
   assigning the retrieved profile data to one or more vehicle sub-systems;

sending the retrieved profile data for storage in the vehicle sub-system data storage of the one or more assigned vehicle sub-systems; and controlling the one or more vehicle sub-systems according to the stored profile data.

2. The method according to claim 1, further comprising:
determining a role of the identified occupant in the vehicle; and
associating the determined role of the identified occupant to the profile data of the identified occupant;
wherein the step of assigning the profile data of the identified occupant to one or more vehicle sub-systems is performed based on the determined role of the identified occupant.

3. The method according to claim 1, further comprising:
controlling periodically the vehicle to determine if the vehicle is used; and
if it is determined that the vehicle is not used, transferring the profile data from the vehicle sub-system data storage to the profile data storage.

4. The method according to claim 1, wherein the step of identifying the occupant in the vehicle further comprises identifying the occupant based on an occupant's physiological and/or behavioral characteristic.

5. The method according to claim 1, wherein the step of identifying the occupant in the vehicle further comprises identifying the occupant based on a signal received from a device associated with the occupant.

6. The method according to claim 1, wherein the profile data comprises a Subscriber Identity Module profile, or an embedded Subscriber Identity Module profile.

7. The method according to claim 1, wherein the profile data comprises an authorization to access user information, a user credential, and a user preference of the occupant.

8. The method according to claim 1, wherein the vehicle sub-system is a communication sub-system, and/or an entertainment sub-system, and/or an insurance monitoring sub-system, and/or a toll payment sub-system, and/or a navigation sub-system.

9. The method according to claim 1, wherein the vehicle sub-system data storage is comprised in an integrated circuit card.

10. An apparatus for profile control of profile data in one or more vehicle sub-systems of a vehicle, each vehicle sub-system comprising a vehicle sub-system data storage, the apparatus comprising:
a sensor configured to detect a presence of an occupant in the vehicle;
a controller configured to identify the occupant in the vehicle, and to assign a profile data to one or more vehicle sub-systems, and to control the one or more vehicle sub-systems according to the profile data; and
an interface configured to:
retrieve from a profile data storage the profile data corresponding to the identified occupant; and
store the retrieved profile data in the vehicle sub-system data storage of the one or more assigned vehicle sub-system.

11. The apparatus according to claim 10, wherein the controller is further configured to:
determine a role of the identified occupant in the vehicle; and
associate the determined role of the identified occupant to the profile data of the identified occupant, wherein
the step of assigning the profile data of the identified occupant to one or more vehicle sub-systems is performed based on the determined role of the identified occupant.

12. The apparatus according to claim 10, wherein the controller is further configured to:
control periodically the vehicle to determine if the vehicle is used; and
if it is determined that the vehicle is not used, transfer the profile data from the vehicle sub-system data storage to the profile data storage.

13. The apparatus according to claim 10, wherein the interface is a machine-to-machine communication interface and/or a wireless communication interface.

14. An integrated circuit card configured to perform the method of claim 1.

15. A non-transitory computer program comprising computer readable code which, when run on a controller of an apparatus, causes the apparatus to perform the method as claimed in claim 1.

16. A vehicle comprising an apparatus for profile control of profile data in one or more vehicle sub-systems of a vehicle, each vehicle sub-system comprising a vehicle sub-system data storage, the apparatus comprising:
a sensor configured to detect a presence of an occupant in the vehicle;
a controller configured to identify the occupant in the vehicle, and to assign a profile data to one or more vehicle sub-systems, and to control the one or more vehicle sub-systems according to the profile data; and
an interface configured to:
retrieve from a profile data storage the profile data corresponding to the identified occupant; and
store the retrieved profile data in the vehicle sub-system data storage of the one or more assigned vehicle sub-system.

* * * * *